US011337028B2

(12) United States Patent
Venkatraman et al.

(10) Patent No.: US 11,337,028 B2
(45) Date of Patent: May 17, 2022

(54) COMBINED FINE TIMING MEASUREMENT (FTM) AND NON-FTM MESSAGING FOR POSITION DETERMINATION

(71) Applicant: QUALCOMM Incorporated, San Diego, CA (US)

(72) Inventors: Sai Pradeep Venkatraman, Santa Clara, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 15/189,501

(22) Filed: Jun. 22, 2016

(65) Prior Publication Data
US 2017/0374513 A1 Dec. 28, 2017

(51) Int. Cl.
| | | |
|---|---|---|
| *H04W 4/02* | (2018.01) | |
| *H04B 17/11* | (2015.01) | |
| *H04W 24/10* | (2009.01) | |
| *H04W 84/12* | (2009.01) | |
| *H04L 12/26* | (2006.01) | |
| *G01S 5/14* | (2006.01) | |
| *G01S 5/02* | (2010.01) | |
| *H04L 43/0864* | (2022.01) | |

(52) U.S. Cl.
CPC ............ *H04W 4/023* (2013.01); *G01S 5/021* (2013.01); *G01S 5/14* (2013.01); *H04B 17/11* (2015.01); *H04L 43/0864* (2013.01); *H04W 24/10* (2013.01); *G01S 5/0236* (2013.01); *H04W 84/12* (2013.01)

(58) Field of Classification Search
None
See application file for complete search history.

(56) References Cited

U.S. PATENT DOCUMENTS

| 9,237,546 B1 | 1/2016 | Zhang et al. | |
|---|---|---|---|
| 9,474,041 B1 * | 10/2016 | Zhang | H04W 4/02 |
| 2014/0335885 A1 * | 11/2014 | Steiner | H04W 64/00 |
| | | | 455/456.1 |
| 2015/0049716 A1 | 2/2015 | Gutierrez et al. | |

(Continued)

FOREIGN PATENT DOCUMENTS

WO 2015183199 A1 12/2015

OTHER PUBLICATIONS

International Search Report and Written Opinion—PCT/US2017/033970—ISA/EPO—dated Sep. 6, 2017.

*Primary Examiner* — Hong Shao
(74) *Attorney, Agent, or Firm* — Thien T. Nguyen

(57) ABSTRACT

In one aspect, a method includes performing, by a wireless station, a fine timing measurement (FTM) procedure with each of one or more FTM-enabled access points (APs) to obtain a respective one or more FTM-based round-trip time (RTT) measurement between the wireless station and each of the one or more FTM-enabled APs. The method also includes performing a non-FTM procedure with each of one or more non-FTM-enabled APs to obtain a respective one or more non-FTM-based RTT measurement. The wireless station then calculates a position of the wireless device based on both the one or more FTM-based RTT measurements and the one or more non-FTM-based RTT measurements.

16 Claims, 8 Drawing Sheets

(56) References Cited

U.S. PATENT DOCUMENTS

| | | |
|---|---|---|
| 2015/0126217 A1* | 5/2015 | Do .................... G01S 5/0252 455/456.1 |
| 2015/0139213 A1 | 5/2015 | Abraham et al. |
| 2015/0181553 A1 | 6/2015 | Segev |
| 2015/0382143 A1 | 12/2015 | Lindskog et al. |
| 2016/0081054 A1 | 3/2016 | Zhang et al. |

* cited by examiner

COMBINED FINE TIMING MEASUREMENT (FTM) AND NON-FTM MESSAGING FOR POSITION DETERMINATION

FIELD OF DISCLOSURE

Aspects of this disclosure relate generally to wireless communications, and more particularly to wireless local area network (WLAN) access point (AP) positioning and navigation systems.

BACKGROUND

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). One class of such multiple-access systems is generally referred to as wireless location area networks (WLANs), such as "Wi-Fi," and includes different members of the Institute of Electrical and Electronics Engineers (IEEE) 802.11 wireless protocol family. Generally, a Wi-Fi communication system can simultaneously support communication for multiple wireless devices, such as wireless stations (STAs). Each STA communicates with one or more access points (APs) via transmissions on the downlink and the uplink. The downlink (DL) refers to the communication link from the APs to the STAs, and the uplink (UL) refers to the communication link from the STAs to the APs.

Modern navigation systems have typically used satellite-based global positioning system (GPS) for position determination. However, the recent proliferation of WLAN (e.g., Wi-Fi) access points has made it possible for navigation systems to use these access points for position determination, especially in urban areas where there are usually large concentrations of WLAN access points. WLAN navigation systems can be advantageous over GPS navigation systems because of limitations of GPS signal coverage. For example, while GPS signals may not be readily available inside a shopping mall, wireless signals generated by WLAN access points inside the shopping mall would be more readily detectable by a STA.

More specifically, for WLAN navigation systems, the locations of the WLAN access points are used as reference points from which well-known trilateration techniques can determine the location (e.g., absolute location and/or relative location) of a wireless device (e.g., a Wi-Fi-enabled cell phone, laptop, or tablet computer). The wireless device can use the round trip time (RTT) of signals transmitted to and from the access points to calculate the distances between the wireless device and the access points. Once these distances are calculated, the location of the wireless device can be estimated using trilateration techniques.

One procedure for determining RTT captures the amount of time between the transmission of a unicast packet, such as a data packet or request-to-send (RTS), by STA to an AP and the reception of the appropriate response packet, which may be an acknowledgement (ACK) or clear-to-send (CTS), as measured by the STA. RTT is typically measured in nanoseconds.

Some chip designs may allow recording of the time of departure (TOD), from the STA and also time of arrival (TOA) at the STA, using timestamps. The timestamps permit measurement of RTT. This method may be referred to as an RTS/CTS-based RTT procedure (also referred to herein as a non-fine timing measurement (FTM) procedure).

However, in measuring RTT there is a variable amount of turnaround time delay involved at the AP, or receiving node, that needs to be accounted for before the RTT may be used for ranging calculations. These ranging calculations using RTT are made by extracting the time of flight between the STA and the AP, which requires knowledge of the turnaround calibration factor (TCF). TCF may be implementation specific and may depend on the short interframe space (SIFS), time of arrival uncertainty, and other delays at the AP. The TCF varies depending on the chipset used by the AP.

Another method for determining the range between nodes is often referred to as the fine timing measurement (FTM) protocol. Based on FTM, a STA exchanges FTM messages with the AP and then receives timing information (e.g., timestamps corresponding to arrival and departure times of the FTM messages at the AP) from the AP. The STA then computes its range to the AP based on the timing information.

SUMMARY

Aspects of the present disclosure include a method, a wireless station, and a computer-readable medium for assisting or otherwise performing position determination based on both fine timing measurement (FTM)-based round trip time (RTT) measurements and non-FTM-based RTT measurements.

For example, in one aspect, a method includes performing, by a wireless station a fine timing measurement (FTM) procedure with each of one or more FTM-enabled access points (APs) to obtain a respective one or more FTM-based round-trip time (RTT) measurements between the wireless station and each of the one or more FTM-enabled APs. The FTM procedure may include: (i) exchanging at least one FTM message with an FTM-enabled AP of the one or more FTM-enabled APs; and (ii) calculating an FTM-based RTT measurement of the one or more FTM-based RTT measurements based on the exchanging of the at least one FTM message. The method also includes performing a non-FTM procedure with each of one or more non-FTM-enabled APs to obtain a respective one or more non-FTM-based RTT measurements, where the non-FTM procedure includes: (i) transmitting a non-FTM message from the first wireless station to a non-FTM-enabled AP of the one or more non-FTM-enabled APs; (ii) receiving a non-FTM response message from the non-FTM-enabled AP of the one or more non-FTM-enabled APs in response to the non-FTM message; and (iii) calculating a non-FTM-based RTT measurement of the one or more non-FTM-based RTT measurements based on a difference between a time of arrival of the non-FTM response messages and a time of departure of the non-FTM message. The wireless station may then calculate a position of the wireless device based on both the one or more FTM-based RTT measurements and the one or more non-FTM-based RTT measurements.

In another aspect, a wireless station includes a transceiver, at least one processor; and at least one memory coupled to the at least one processor. The at least one processor and the at least one memory are configured to direct the wireless station to perform a fine timing measurement (FTM) procedure with each of one or more FTM-enabled access points (APs) to obtain a respective one or more FTM-based round-trip time (RTT) measurement between the wireless station and each of the one or more FTM-enabled APs. The FTM procedure may include: (i) exchanging at least one FTM message with an FTM-enabled AP of the one or more FTM-enabled APs; and (ii) calculating an FTM-based RTT measurement of the one or more FTM-based RTT measurements based on the exchanging of the at least one FTM message. The at least one processor and the at least one memory are also configured to direct the wireless station to perform a non-FTM procedure with each of one or more non-FTM-enabled APs to obtain a respective one or more non-FTM-based RTT measurements, where the non-FTM procedure includes: (i) transmitting a non-FTM message from the first wireless station to a non-FTM-enabled AP of the one or more non-FTM-enabled APs; (ii) receiving a non-FTM response message from the non-FTM-enabled AP of the one or more non-FTM-enabled APs in response to the non-FTM message; and (iii) calculating a non-FTM-based RTT measurement of the one or more non-FTM-based RTT measurements based on a difference between a time of arrival of the non-FTM response messages and a time of departure of the non-FTM message. The at least one processor and the at least one memory may then direct the wireless station to calculate a position of the wireless device based on both the one or more FTM-based RTT measurements and the one or more non-FTM-based RTT measurements.

In yet another aspect, a wireless station includes means for performing a fine timing measurement (FTM) procedure with each of one or more FTM-enabled access points (APs) to obtain a respective one or more FTM-based round-trip time (RTT) measurement between the wireless station and each of the one or more FTM-enabled APs. The means for performing the FTM procedure may include: (i) means for exchanging at least one FTM message with an FTM-enabled AP of the one or more FTM-enabled APs; and (ii) means for calculating an FTM-based RTT measurement of the one or more FTM-based RTT measurements based on the exchanging of the at least one FTM message. The wireless station also includes means for performing a non-FTM procedure with each of one or more non-FTM-enabled APs to obtain a respective one or more non-FTM-based RTT measurements, where the means for performing the non-FTM procedure includes: (i) means for transmitting a non-FTM message from the first wireless station to a non-FTM-enabled AP of the one or more non-FTM-enabled APs; (ii) means for receiving a non-FTM response message from the non-FTM-enabled AP of the one or more non-FTM-enabled APs in response to the non-FTM message; and (iii) means for calculating a non-FTM-based RTT measurement of the one or more non-FTM-based RTT measurements based on a difference between a time of arrival of the non-FTM response messages and a time of departure of the non-FTM message. The wireless station also includes means for calculating a position of the wireless device based on both the one or more FTM-based RTT measurements and the one or more non-FTM-based RTT measurements.

In another aspect, a non-transitory computer-readable medium includes program code stored thereon. The program code includes instructions to direct a wireless station to perform a fine timing measurement (FTM) procedure with each of one or more FTM-enabled access points (APs) to obtain a respective one or more FTM-based round-trip time (RTT) measurement between the wireless station and each of the one or more FTM-enabled APs. The FTM procedure may include: (i) exchanging at least one FTM message with an FTM-enabled AP of the one or more FTM-enabled APs; and (ii) calculating an FTM-based RTT measurement of the one or more FTM-based RTT measurements based on the exchanging of the at least one FTM message. The program code also includes instructions to direct the wireless station to perform a non-FTM procedure with each of the one or more non-FTM-enabled APs to obtain a respective one or more non-FTM-based RTT measurements, where the non-FTM procedure includes: (i) transmitting a non-FTM message from the first wireless station to a non-FTM-enabled AP of the one or more non-FTM-enabled APs; (ii) receiving a non-FTM response message from the non-FTM-enabled AP of the one or more non-FTM-enabled APs in response to the non-FTM message; and (iii) calculating a non-FTM-based RTT measurement of the one or more non-FTM-based RTT measurements based on a difference between a time of arrival of the non-FTM response messages and a time of departure of the non-FTM message. The program code may further include instructions to direct the wireless station to calculate a position of the wireless device based on both the one or more FTM-based RTT measurements and the one or more non-FTM-based RTT measurements.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
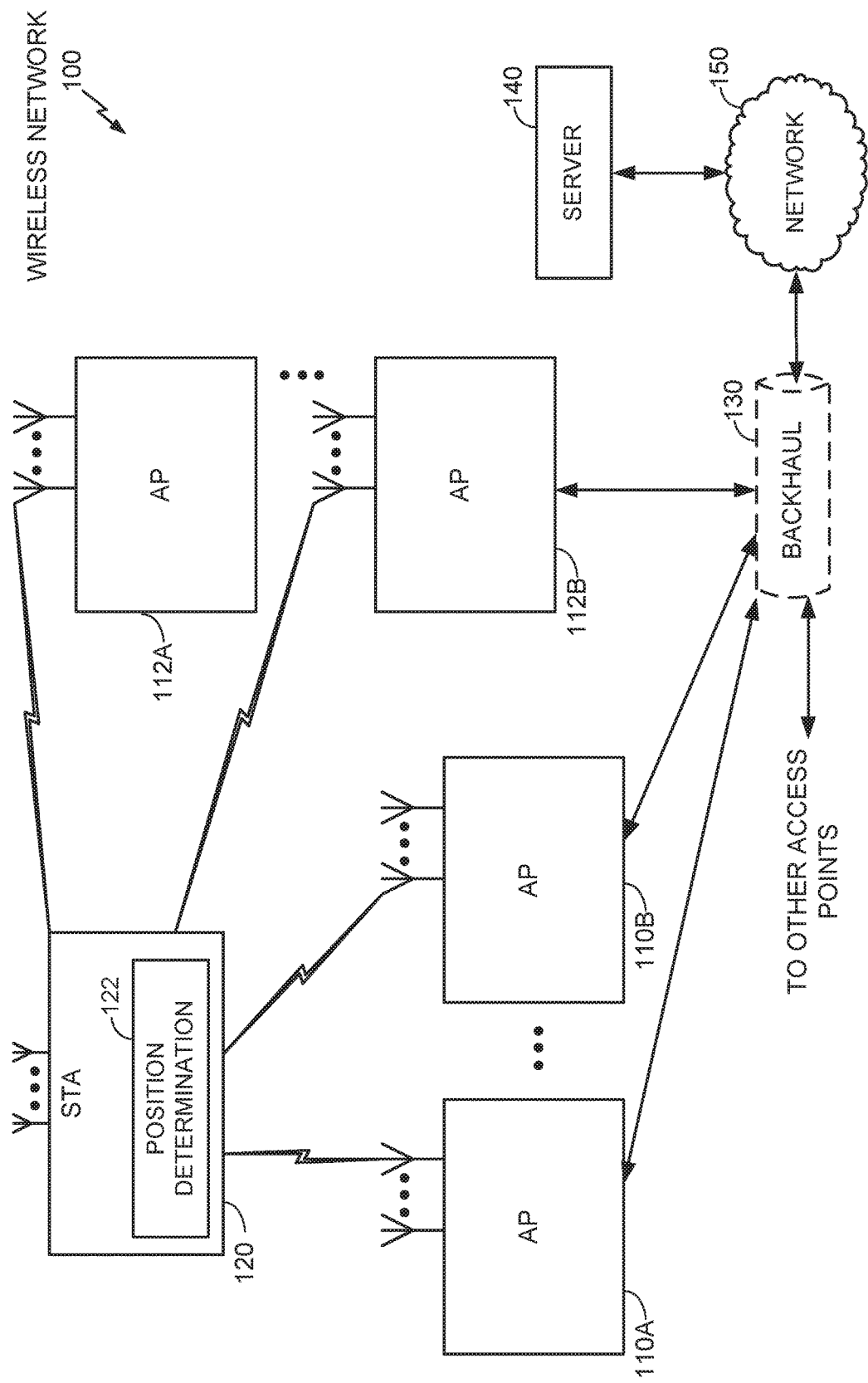
FIG. 1 illustrates an example wireless network employing a Wi-Fi protocol.

FIG. 1 illustrates an example wireless network 100. As shown, the wireless network 100, which may also be referred to herein as a Basic Service Set (BSS), is formed from several wireless nodes, including one or more Access Points (APs) 110A, 110B, 112A, and 112B and at least one wireless station (STA) 120. Each wireless node is generally capable of receiving and/or transmitting. The wireless network 100 may support any number of APs 110A, 110B, 112A, and 112B distributed throughout a geographic region to provide coverage for the STA 120. For simplicity, only four APs 110A, 110B, 112A, and 112B are shown in FIG. 1, providing coordination and control among the STA 120 and other STAs (not shown), as well as access to other APs, server 140, or a network 150 (e.g., the Internet) via a backhaul connection 130. However, in other examples, the wireless network 100 may include many (more than four) APs, including several APs operating on the same WLAN channel and several other APs operating on different WLAN channels.

The APs 110A, 110B, 112A, and 112B are generally fixed entities that provide backhaul services to the STA 120 in their geographic region of coverage. However, the APs 110A, 110B, 112A, and 112B may be mobile in some applications (e.g., a mobile device serving as a wireless hotspot for other devices). The STA 120 may be fixed or mobile. Examples of STA 120 include a telephone (e.g., cellular telephone), a laptop computer, a desktop computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices. In general, these networking protocols may be referred to as "Wi-Fi," including any member of the Institute of Electrical and Electronics Engineers (IEEE) 802.11 wireless protocol family.

In one example, 802.11mc is one protocol that provides access points with ability to perform fine timing measurements (FTM) with STA 120. As 802.11mc APs start to deploy, there will be venues with a mix of APs (i.e., some APs within a venue will be FTM-enabled APs, while other APs within the venue will be legacy APs that are non-FTM-enabled APs). Using the non-FTM-enabled APs for position determinations will require the use of a non-FTM procedure, such as the RTS/CTS-based method. However, as mentioned above, the RTS/CTS-based RTT method requires knowledge of the APs TCF (i.e., the APs turn-around calibration factor).

For example, the STA 120 of FIG. 1 may be configured to perform ranging operations using a fine timing measurement (FTM) procedure and/or via a non-FTM procedure. APs 110A and 110B are FTM-enabled APs such that STA 120 may perform the FTM procedure with the APs 110A and 110B for RTT measurements. However, APs 112A and 112B may be non-FTM-enabled APs, such that STA 120 is not able to perform the FTM procedure with the APs 112A and 112B. Instead, the STA 120 may be required to perform a non-FTM procedure, such as the RTS/CTS-based RTT method to perform RTT measurements with APs 112A and 112B. In one example, APs 112A and 112B are legacy devices that do not include the capability to perform RTT measurements using an FTM procedure. In another example, APs 112A and 112B have the capability to perform FTM procedures, but that feature is disabled or otherwise incapacitated. As mentioned above, the RTS/CTS-based RTT procedure requires knowledge of one or more delays, such as the turnaround calibration factor (TCF) at the APs 112A and 112B.

Accordingly, STA 120 may be variously configured in accordance with the teachings herein to provide or otherwise support the position determination of STA 120 based on both an FTM procedure performed with one or more of the APs 110A and 110B and on a non-FTM procedure performed with one or more of the APs 112A and 112B in wireless network 100. Thus, as shown in FIG. 1, the STA 120 may include a position determination block 122 for determining the position of the STA 120 based on both the FTM procedure and the non-FTM procedure. These and other aspects will be described in more detail below.

Figure 2:
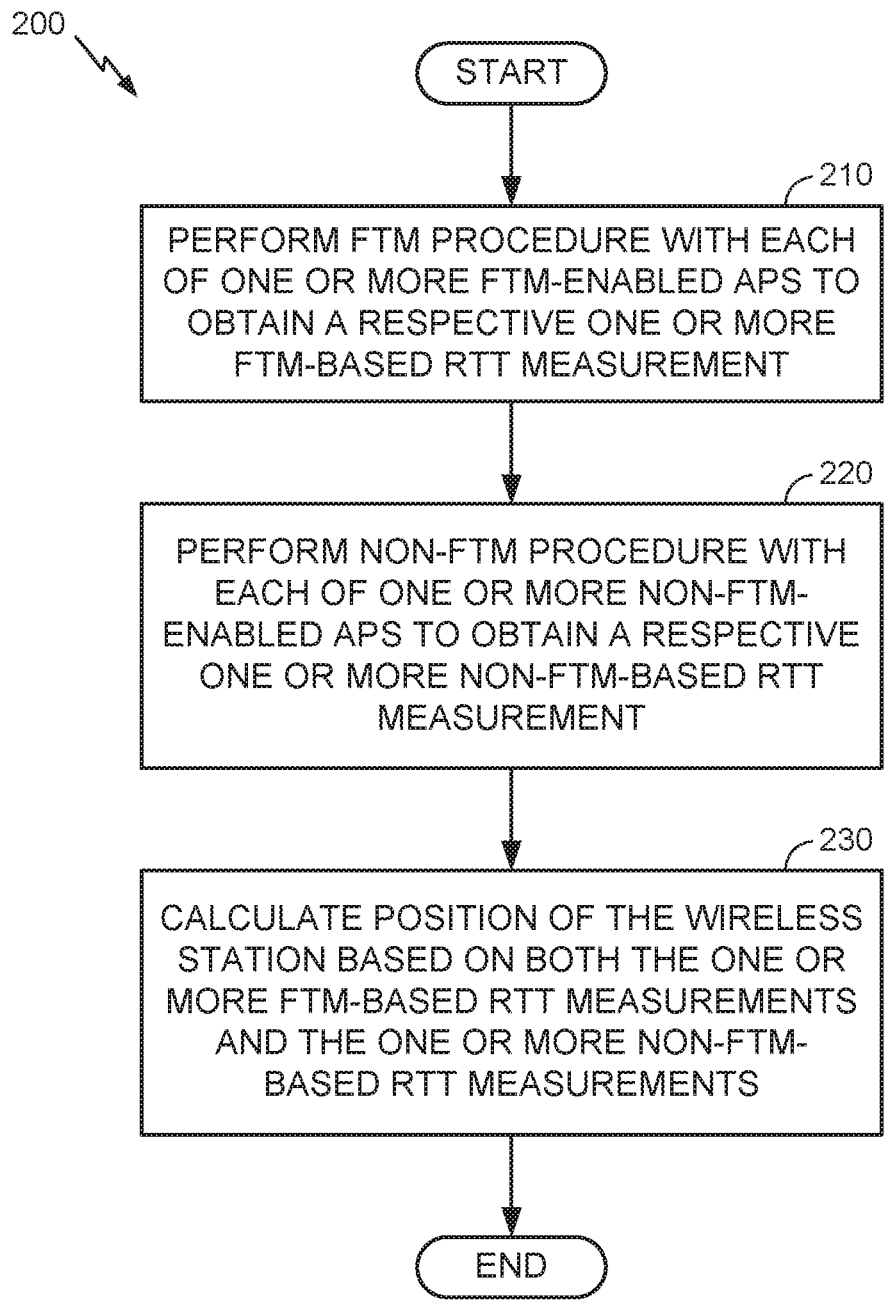
FIG. 2 is a flowchart illustrating a process of determining a position of a wireless station using both a fine timing measurement (FTM) procedure and a non-FTM procedure.

FIG. 2 is a flowchart illustrating a process 200 of determining a position of a wireless station using both an FTM procedure and a non-FTM procedure (e.g., STA 120 under direction of position determination block 122).

In process block 210, STA 120 performs an FTM procedure with each of one or more FTM-enabled APs 110A and 110B to obtain a respective one or more FTM-based round-trip time (RTT) measurements between the STA 120 and the APs 110A and 110B. In one aspect, the FTM procedure includes exchanging one or more FTM messages between the STA 120 and the AP 110A to obtain the first FTM-based RTT measurement. Similarly, STA 120 and AP 110B may exchange one or more FTM messages to obtain a second FTM-based RTT measurement. For example, the exchanging of FTM messages may include the STA 120 transmitting an FTM request message to the AP 110A, receiving an FTM response message from the AP 110A, transmitting an FTM acknowledgement message to the AP 110A, and then receiving timing information from the AP 110A. The timing information may indicate a time of departure of the FTM response message from the AP 110A, as well as a time of arrival of the FTM acknowledgement message at the AP 110A. In one example, the timing information is sent as timestamps from the AP 110A to the STA 120. The STA 120 may then compute the first FTM-based RTT measurement using the timing information received from the AP 110A as well as timing information (e.g., timestamps) generated at the STA 120, itself. Further details regarding the FTM procedure will be described below with reference to FIG. 3.

Next, in process block 220, the STA 120 performs a non-FTM procedure with each of one or more non-FTM-enabled APs 112A and 112B to obtain a respective one or more non-FTM-based RTT measurements between the STA 120 and the APs 112A and 112B. In one example, the non-FTM procedure includes transmitting a non-FTM message from the STA 120 to the AP 112A, receiving a non-FTM response message from the AP 112A in response to the non-FTM message, and calculating a non-FTM-based RTT measurement based on a difference between a time of arrival of the non-FTM response message and a time of departure of the non-FTM message. By way of example, the non-FTM message may be a request-to-send (RTS) message and the non-FTM response message may be a clear-to-send (CTS) message. Thus, in one implementation, the STA 120 is configured to generate a timestamp corresponding to the time of departure when the RTS message is transmitted and to generate another timestamp corresponding to the time of arrival when the CTS message is received at the STA 120. The STA 120 may calculate the non-FTM-based RTT measurement by subtracting the time of departure of the RTS message from the time of arrival of the CTS message.

In one example, the STA 120 calculates the second RTT without compensating for any delays that may be imposed by the APs 112A and 112B in the processing of the non-FTM messages. Thus, any delays between when the APs 112A and 112B receive the non-FTM message and when the APs 112A and 112B transmit their non-FTM response messages are included in the non-FTM-based RTT measurements, such that the non-FTM-based RTT measurements may be referred to as uncompensated RTT measurements.

Next, in process block 230, the STA 120 calculates a position of the STA 120 based on both the one of more FTM-based RTT measurements and the one or more non-FTM-based RTT measurements. In one example, the STA 120 calculates the position of the STA 120 using both the FTM-based RTT measurements and the non-FTM-based RTT measurements directly, without an intervening determination of the position of the STA 120. That is, rather than combining a position determination based on the FTM-based RTT measurements with a position determination based on the non-FTM-based RTT measurements, aspects of the present disclosure may include the STA 120 performing a single position determination using both the FTM-based and non-FTM-based RTT measurements.

Although FIG. 2 illustrates process 200 as performing the FTM procedure and then the non-FTM procedure, other examples may include performing the procedures in a reverse order, or even simultaneously. That is, STA 120 may perform the non-FTM procedure first and then perform the FTM procedure in accordance with the teachings herein, or the STA 120 may perform at least some of the non-FTM procedures with some of the non-FTM-enabled APs during the same time period that the STA 120 performs at least some of the FTM procedures with the FTM-enabled APs.

Figure 3:
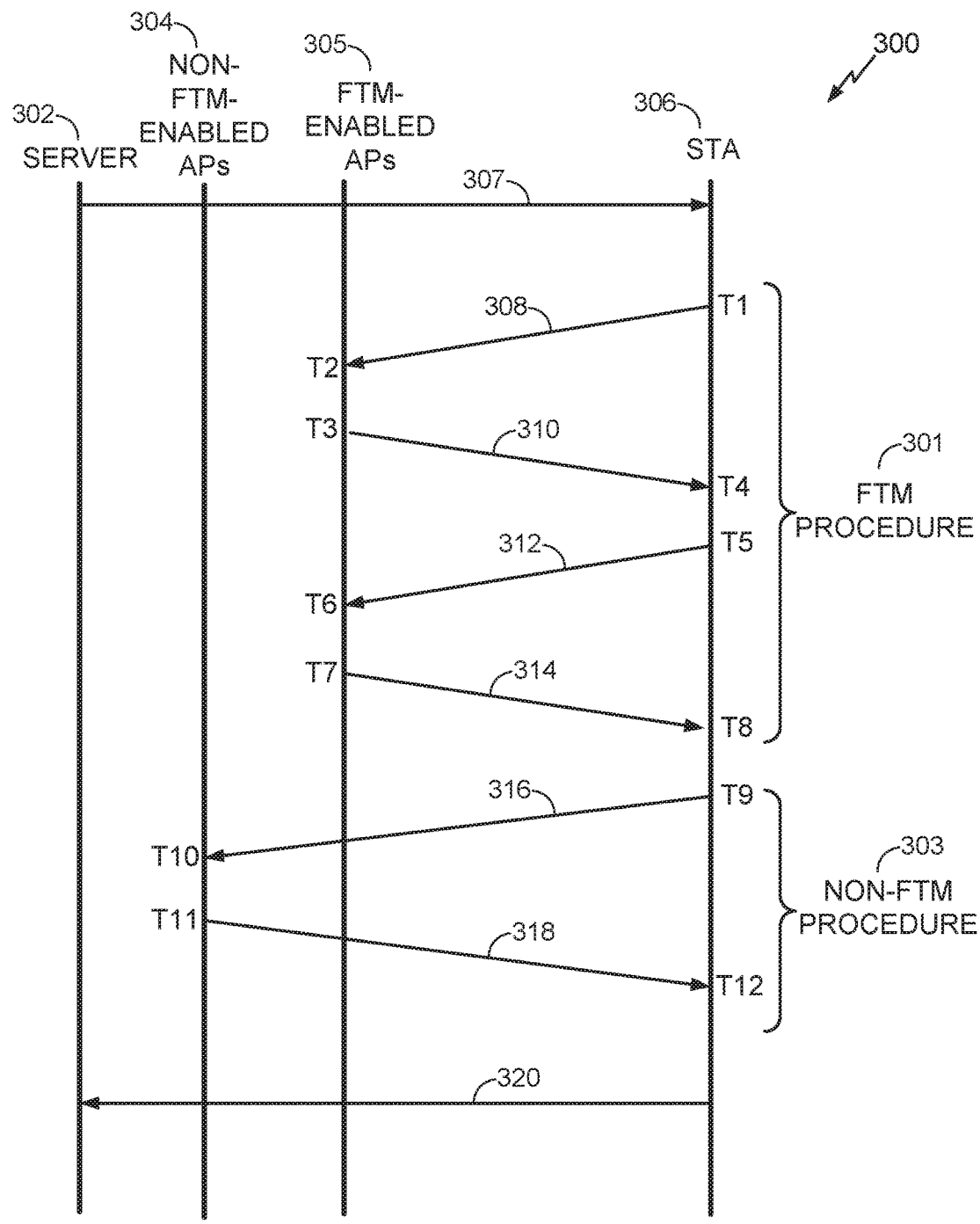
FIG. 3 is a call flow procedure illustrating a process of determining a position of a wireless station using both an FTM procedure and a non-FTM procedure.

FIG. 3 is a call flow procedure illustrating process 300 of determining a position of a wireless station (e.g., STA 120) using both an FTM and a non-FTM procedure. Process 300 is one possible implementation of process 200 of FIG. 2.

As shown in FIG. 3, process 300 includes an optional step of a STA 306 receiving position assistance data 307 from a server 302 (e.g., corresponding to server 140 of FIG. 1). In one example, the position assistance data 307 includes a position of one or more non-FTM-enabled APs 304 and/or the position of one or more FTM-enabled APs 305.

FIG. 3 further illustrates an FTM procedure 301 that includes exchanging FTM messages 308-314 between STA 306 and FTM-enabled APs 305. In particular, at time T1, STA 306 transmits an FTM request message 308, which is received at an FTM-enabled AP of the FTM-enabled APs 305 at time T2. In response to the FTM request message 308, the FTM-enabled AP 305 transmits an FTM response message 310 at time T3. The FTM response message 310 is received at the STA 306 at time T4. The STA 306 then transmits an acknowledgement message 312 at time T5. Furthermore, the STA 306 may generate a first timestamp corresponding to time T4 and a second timestamp corresponding to time T5. At time T6, the FTM-enabled AP 305 receives the acknowledgement message 312 and in response thereto, generates a timing information message 314 which is sent back to the STA 306 at time T7. The timing information message 314 includes the time of departure of the FTM response message 310 (i.e., time T3) as well as the time of arrival of the acknowledgement message 312 (i.e., time T6). In one example, the time of departure corresponding to time T3 and the time of arrival corresponding to time T6 are included in the timing information message 314 as timestamps generated by the FTM-enabled AP 305. Upon receipt of the timing information message 314 at time T8, the STA 306 may then calculate a first FTM-based RTT measurement. In one aspect, the first FTM-based RTT measurement is calculated based on the times T3, T4, T5, and T6. For example, STA 306 may calculate the first FTM-based RTT measurement as (T6−T3)−(T5−T4).

Next, STA 306 may perform a non-FTM procedure 303 that includes exchanging non-FTM messages 316 and 318 between the STA 306 and one or more non-FTM-enabled APs 304. At time T9, the STA 306 transmits a non-FTM message 316 to a non-FTM-enabled AP of the non-FTM-enabled APs 304. In one example, the non-FTM message 316 is a request-to-send (RTS) message, but could alternatively be a data message. Also, at time T9, STA 306 generates a timestamp corresponding to a time of departure of the non-FTM message 316 (i.e., time T9). The non-FTM message 316 is received at the non-FTM-enabled AP 304 at time T10, which then transmits a non-FTM response message 318 to the STA 306 at time T11. In one aspect, the non-FTM response message 318 is a clear-to-send (CTS) message, but alternatively could be an acknowledgement message.

The STA 306 then receives the non-FTM response message 318 at time T12 and generates a timestamp corresponding to a time of arrival of the non-FTM response message 318 (i.e., time T12). The STA 306 may then calculate the non-FTM-based RTT measurement based on the times T9 and T12 (e.g., T12−T9). As shown in FIG. 3, the non-FTM-enabled APs 304 may encounter one or more delays between the receipt of the non-FTM message 316 at time T10 and the transmitting of the non-FTM response message 318 at time T11. Thus, the non-FTM-based RTT measurement calculated by the STA 306 is an uncompensated RTT measurement that includes one or more delays incurred at the non-FTM-enabled APs 304 (e.g., delay=T11−T10).

As will be discussed below, the STA 306 may calculate a TCF estimate of the non-FTM-enabled APs 304 in addition to calculating a position of the STA 306. In one example, the TCF estimate is an estimate of the delay encountered at the non-FTM-enabled APs 304 from time T10 to time T11.

After the STA 306 has calculated the TCF estimate of the non-FTM-enabled APs 304, the STA 306 may send TCF estimates to server 302. The message 320 may include a single TCF estimate for each of the non-FTM-enabled APs 304 calculated by the STA 306 or it may include an average of multiple TCF estimates calculated by the STA 306 corresponding to FTM and non-FTM procedures performed with the non-FTM-enabled APs 304. In one example, the server 302 may store one or more of the TCF estimates received by way of message 320. The server 302 may then provide the TCF estimates to other wireless stations that may not be FTM-enabled. In another example, the STA 306 may store the one or more TCF estimates locally at the STA 306, itself. The locally stored TCF estimates may then be utilized by the STA 306 in future position determinations where there are an insufficient number of FTM-enabled APs to determine a position of the STA 306.

In some examples, STA 120/306 is configured to calculate various parameters (e.g., STA 120/306 position, non-FTM-enabled AP position, FTM-enabled AP position, TCF estimates, etc.) related to position determinations depending on the amount of information and/or the number of FTM-enabled and non-FTM enabled APs available to the STA 120/306. A number of example use cases are described below with reference to FIGS. 4A-4C.

Figure 4A:
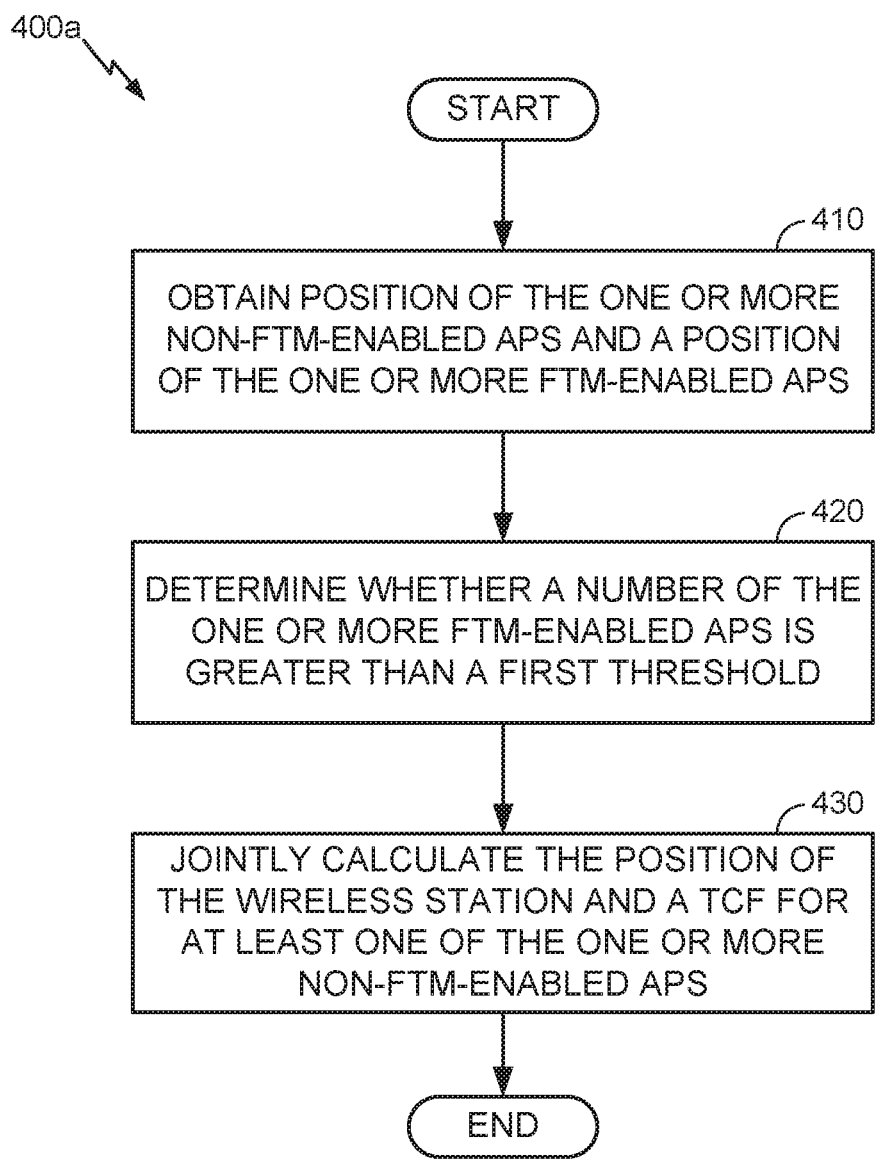
FIG. 4A is a flowchart illustrating a process for the joint calculation of a position of the wireless station and a turnaround calibration factor (TCF) of non-FTM-enabled access points (APs).

FIG. 4A is a flowchart illustrating a process 400a for the joint calculation of a position of the wireless station (e.g., STA 120/306) and a turnaround calibration factor (TCF) of non-FTM-enabled access points (APs). In process block 410, the wireless station obtains the position of one or more of the non-FTM-enabled APs 304 and a position of the one or more FTM-enabled APs 305. As mentioned above, the wireless station may obtain the position of the non-FTM-enabled APs and/or FTM-enabled APs by way of the position assistance data 307 received from server 302.

In process block 420, the wireless station determines whether a number of available FTM-enabled APs is greater than a first threshold. That is, the first threshold relates to a number of FTM-enabled APs that would allow the wireless station to jointly calculate the position of the wireless device and a TCF for at least one of the non-FTM-enabled APs 304. If the number of FTM-enabled APs is greater than the first threshold, then process block 430 includes the wireless device performing the joint calculation of the position of the wireless device and the TCF for one or more of the non-FTM enabled APs 304. In one example, the joint calculation of the position of the wireless device and the TCF includes calculating both the position of the wireless device and the TCF, without an intervening determination of the position of the wireless device. That is, rather than first determining a position of the wireless device and then determining a TCF of the non-FTM-enabled APs, aspects of the present disclosure may include the wireless performing a single procedure that determines both the position of the wireless device and the TCF of the non-FTM-enabled APs.

Figure 4B:
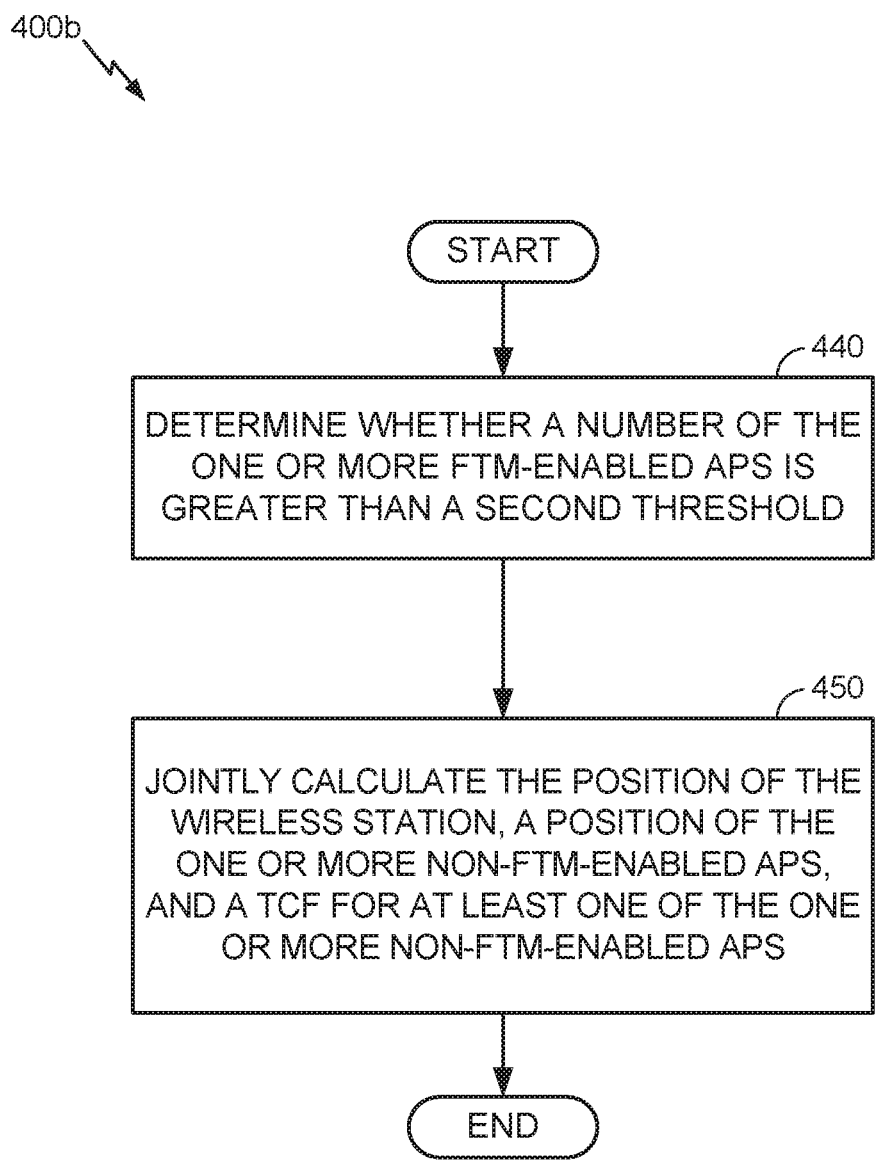
FIG. 4B is a flowchart illustrating a process for the joint calculation of a position of the wireless station, a position of non-FTM-enabled APs, and a turnaround calibration factor (TCF) of the non-FTM-enabled APs.

FIG. 4B is a flowchart illustrating a process 400b for the joint calculation of a position of the wireless station, a position of non-FTM-enabled APs, and a turnaround calibration factor (TCF) of the non-FTM-enabled APs. In process 400b, the position of one or more of the non-FTM-enabled APs is unknown to the wireless station. Thus, in process block 440, the wireless station determines whether a number of available FTM-enabled APs is greater than a second threshold. That is, the second threshold relates to a number of FTM-enabled APs that would allow the wireless station to jointly calculate the position of the wireless device, a position of one or more of the non-FTM-enabled APs 304, and a TCF for at least one of the non-FTM-enabled APs 304. In one example, the second threshold is variable and relates to the number of unknowns to be determined by the wireless station. That is, the more TCF estimates that are unknown and/or the more non-FTM-enabled AP positions that are to be determined, means that a greater number of FTM-enabled APs are needed for the joint calculation of wireless station position, non-FTM-enabled AP positions, and TCF estimates of the non-FTM-enabled APs. In one aspect, the second threshold is met if the number of available FTM-enabled APs exceeds the number of unknowns, which include the number of TCF estimates and non-FTM-enabled AP positions that are to be determined.

If the number of FTM-enabled APs is greater than the second threshold, then process block 450 includes the wireless device performing the joint calculation of the position of the wireless device, a position of one or more of the non-FTM-enabled APs 304, and the TCF for the one or more non-FTM enabled APs 304. In one example, the joint calculation of the position of the wireless device, the position of the non-FTM enabled APs 304, and the TCF includes calculating the position of the wireless device, the position of the non-FTM-enabled APs 304, and the TCF, without an intervening determination of the position of the wireless device. That is, rather than first determining a position of the wireless device and then determining the position of the non-FTM-enabled AP 304 and/or a TCF of the non-FTM-enabled APs, aspects of the present disclosure may include the wireless performing a single procedure that determines the position of the wireless device, the position of the non-FTM-enabled APs, and the TCF of the non-FTM-enabled APs.

Figure 4C:
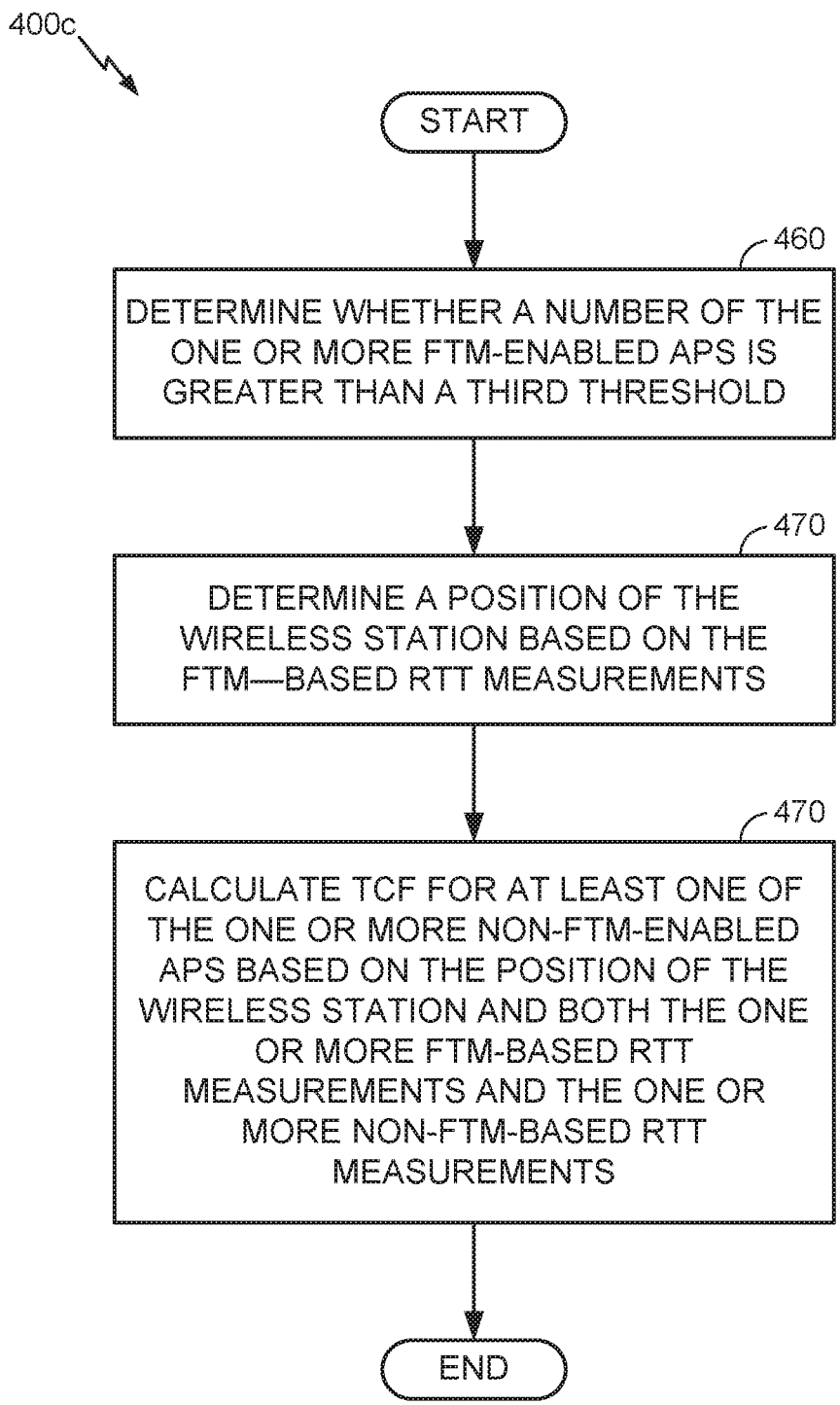
FIG. 4C is a flowchart illustrating a process for the calculation of a turnaround calibration factor (TCF) of non-FTM-enabled APs.

FIG. 4C is a flowchart illustrating a process 400c for the calculation of a turnaround calibration factor (TCF) of non-FTM-enabled APs. In process 400c, the position of one or more of the non-FTM-enabled APs is known to the wireless station. Thus, in process block 460, the wireless station determines whether a number of available FTM-enabled APs is greater than a third threshold. That is, the third threshold relates to a number of FTM-enabled APs that would allow the wireless station to calculate the position of the wireless device, and then subsequently calculate a TCF for one or more of the non-FTM-enabled APs whose position is known to the wireless station.

If the number of FTM-enabled APs is greater than the third threshold, then process block 470 includes the wireless device performing the calculation of the position of the wireless device. In one example, the calculation of the position of the wireless device is determined by the wireless station based on the FTM-based RTT measurements obtained by way of the FTM procedure 301 performed with the FTM-enabled APs 305. Next, in process block 470, the wireless device calculates a TCF of at least one of the non-FTM-enabled APs 304 based on the calculated position of the wireless device (i.e., process block 470) and based on both the FTM-based RTT measurements (i.e., via FTM procedure 301) and the non-FTM-based RTT measurements (i.e., via non-FTM procedure 303).

Figure 5:
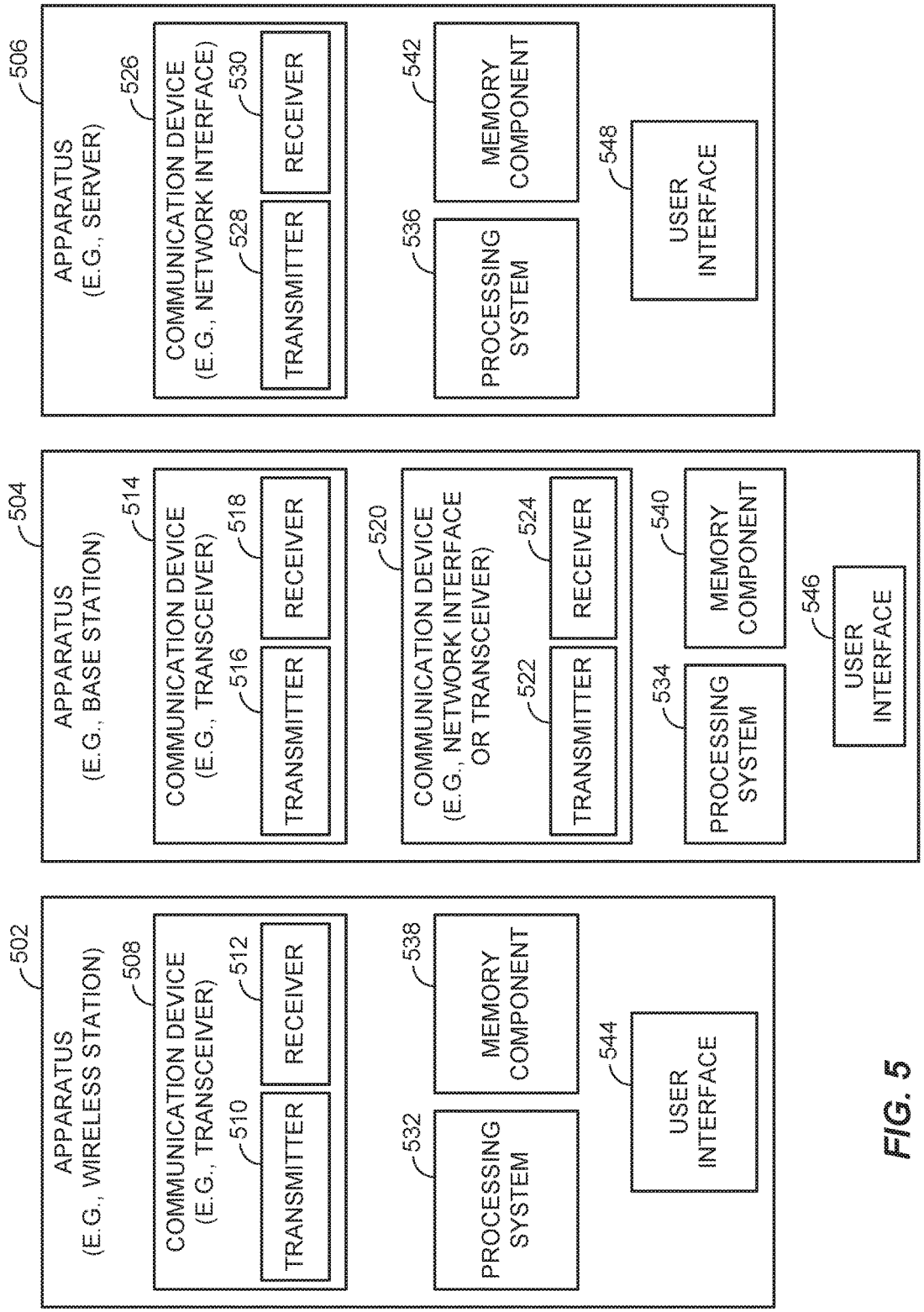
FIG. 5 is a simplified block diagram of several sample aspects of components that may be employed in an apparatus and configured to support communication as taught herein.

FIG. 5 illustrates several sample components (represented by corresponding blocks) that may be incorporated into an apparatus 502, an apparatus 504, and an apparatus 506 (corresponding to, for example, a wireless station (STA), a base station, and a server, respectively) to support the position determination of a wireless station, as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of components. For example, an apparatus may include multiple transceiver components that enable the apparatus to operate on multiple carriers and/or communicate via different technologies.

The apparatus 502 and the apparatus 504 each include at least one wireless communication device (represented by communication devices 508 and 514 (and communication device 520 if the apparatus 504 is a relay)) for communicating with other nodes via at least one designated radio access technology (RAT). Each communication device 508 includes at least one transmitter (represented by transmitter 510) for transmitting and encoding signals (e.g., messages, indications, information, and so on) and at least one receiver (represented by receiver 512) for receiving and decoding signals (e.g., messages, indications, information, pilots, and so on). Similarly, each communication device 514 includes at least one transmitter (represented by transmitter 516) for transmitting signals (e.g., messages, indications, information, pilots, and so on) and at least one receiver (represented by receiver 518) for receiving signals (e.g., messages, indications, information, and so on). If the apparatus 504 is a relay station, each communication device 520 may include at least one transmitter (represented by transmitter 522) for transmitting signals (e.g., messages, indications, information, pilots, and so on) and at least one receiver (represented by receiver 524) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 504 may also comprise a Network Listen Module (NLM) or the like for performing various measurements.

The apparatus 506 (and the apparatus 504 if it is not a relay station) includes at least one communication device (represented by communication device 526 and, optionally, communication device 520) for communicating with other nodes. For example, the communication device 526 may comprise a network interface that is configured to communicate with one or more network entities via a wire-based or wireless backhaul. In some aspects, the communication device 526 may be implemented as a transceiver configured to support wire-based or wireless signal communication. This communication may involve, for example, sending and receiving: messages, parameters, or other types of information. Accordingly, in the example of FIG. 5, the communication device 526 is shown as comprising a transmitter 528 and a receiver 530. Similarly, if the apparatus 504 is not a relay station, the communication device 520 may comprise a network interface that is configured to communicate with one or more network entities via a wire-based or wireless backhaul. As with the communication device 526, the communication device 520 is shown as comprising a transmitter 522 and a receiver 524.

The apparatuses 502, 504, and 506 also include other components that may be used in conjunction with the position determination of a wireless station as taught herein. The apparatus 502 includes a processing system 532 for providing functionality relating to, for example, the performing of an FTM procedure, the performing of a non-FTM procedure, and the calculating a position of the wireless station, as taught herein, and for providing other processing functionality. The apparatus 504 includes a processing system 534 for providing functionality relating to, for example, exchanging FTM and/or non-FTM messages, as taught herein, and for providing other processing functionality. The apparatus 506 includes a processing system 536 for providing functionality relating to, for example, providing position assistance data, and for providing other processing functionality. The apparatuses 502, 504, and 506 include memory components 538, 540, and 542 (e.g., each including a memory device), respectively, for maintaining information (e.g., information indicative of reserved resources, thresholds, parameters, and so on). In addition, the apparatuses 502, 504, and 506 include user interface devices 544, 546, and 548, respectively, for providing indications (e.g., audible and/or visual indications) to a user and/or for receiving user input (e.g., upon user actuation of a sensing device such a keypad, a touch screen, a microphone, and so on).

For convenience, the apparatuses 502, 504, and/or 506 are shown in FIG. 5 as including various components that may be configured according to the various examples described herein. It will be appreciated, however, that the illustrated blocks may have different functionality in different designs.

The components of FIG. 5 may be implemented in various ways. In some implementations, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 508, 532, 538, and 544 may be implemented by processor and memory component(s) of the apparatus 502 (e.g., by execution of appropriate code and/or by appropriate configuration of processor components). Similarly, some or all of the functionality represented by blocks 514, 520, 534, 540, and 546 may be implemented by processor and memory component(s) of the apparatus 504 (e.g., by execution of appropriate code and/or by appropriate configuration of processor components). Also, some or all of the functionality represented by blocks 526, 536, 542, and 548 may be implemented by processor and memory component(s) of the apparatus 506 (e.g., by execution of appropriate code and/or by appropriate configuration of processor components).

Figure 6:
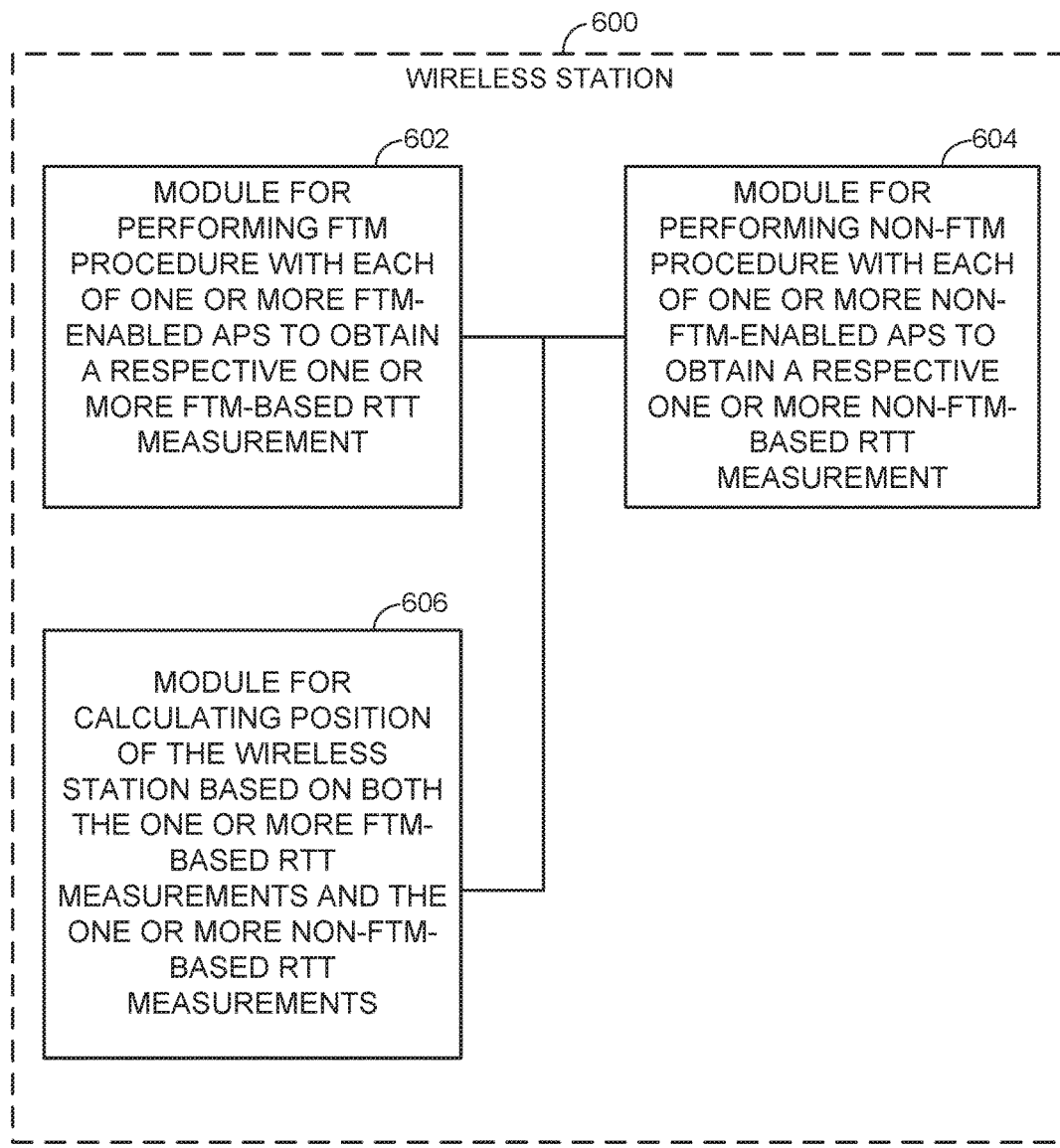
FIG. 6 is a simplified block diagram of several sample aspects of apparatuses configured to support communication as taught herein.

FIG. 6 illustrates an example wireless station (STA) 600 represented as a series of interrelated functional modules. STA 600 is one possible implementation of STA 120 and/or apparatus 502. A module 602 for performing an FTM procedure with each of one or more FTM-enabled APs to obtain a respective one or more FTM-based RTT measurements may correspond at least in some aspects to, for example, a communication device 508, as discussed herein. A module 604 for performing a non-FTM procedure with each of one or more non-FTM-enabled APs to obtain a respective one or more non-FTM-based RTT measurements may correspond at least in some aspects to, for example, a communication device 508, as discussed herein. A module 606 for calculating a position of the wireless station based on both the one or more FTM-based RTT measurements and the one or more non-FTM-based RTT measurements may correspond, at least in some aspects to, for example, processing system 532 and/or memory component 538.

The functionality of the modules of FIG. 6 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method as discussed above with reference to FIGS. 2-4C.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by a wireless station, the method comprising:
    performing a fine timing measurement (FTM) procedure with each of one or more FTM-enabled access points (APs) to obtain a respective one or more FTM-based round-trip time (RTT) measurements between the wireless station and each of the one or more FTM-enabled APs, wherein the FTM procedure comprises:
        exchanging at least one FTM message with an FTM-enabled AP of the one or more FTM-enabled APs; and
        calculating an FTM-based RTT measurement of the one or more FTM-based RTT measurements based on the exchanging of the at least one FTM message;
    performing a non-FTM procedure with each of one or more non-FTM-enabled APs to obtain a respective one or more non-FTM-based RTT measurements, wherein the non-FTM procedure comprises:
        transmitting a non-FTM message from the wireless station to a non-FTM-enabled AP of the one or more non-FTM-enabled APs;
        receiving a non-FTM response message from the non-FTM-enabled AP of the one or more non-FTM-enabled APs in response to the non-FTM message; and
        calculating a non-FTM-based RTT measurement of the one or more non-FTM-based RTT measurements based on a difference between a time of arrival of the non-FTM response message and a time of departure of the non-FTM message, the non-FTM-based RTT measurement being uncompensated for a delay between a receive time of the non-FTM message at the non-FTM-enabled AP of the one or more non-FTM-enabled APs and a transmit time of the non-FTM response message at the non-FTM-enabled AP of the one or more non-FTM-enabled APs; and
    calculating a position of the wireless station based on both the one or more FTM-based RTT measurements and the one or more non-FTM-based RTT measurements, wherein the calculation comprises:
        determining whether a number of the one or more FTM-enabled APs is greater than a first threshold; and if so,
        jointly calculating the position of the wireless station, a position of the one or more non-FTM-enabled APs, and a turnaround calibration factor (TCF) for at least one of the one or more non-FTM-enabled APs based on both the one or more FTM-based RTT measurements and the one or more non-FTM-based RTT measurements.

2. The method of claim 1,
wherein the TCF is further based on the position of the wireless station.

3. The method of claim 1, wherein the exchanging of the at least one FTM message with the FTM-enabled AP of the one or more FTM-enabled APs of the FTM procedure comprises:
transmitting an FTM request message from the wireless station to the FTM-enabled AP;
receiving an FTM response message from the FTM-enabled AP;
transmitting an FTM acknowledgement message from the wireless station to the FTM-enabled AP; and
receiving timing information from the FTM-enabled AP, wherein the timing information comprises a time of departure of the FTM response message from the FTM-enabled AP and a time of arrival of the FTM acknowledgement message at the FTM-enabled AP.

4. The method of claim 1, wherein the non-FTM message comprises a request-to-send (RTS) message, and wherein the non-FTM response message comprises a clear-to-send (CTS) message.

5. A wireless station, comprising:
a transceiver;
at least one processor; and
at least one memory coupled to the at least one processor, the at least one processor and the at least one memory being configured to direct the wireless station to:
perform a fine timing measurement (FTM) procedure with each of one or more FTM-enabled access points (APs) to obtain a respective one or more FTM-based round-trip time (RTT) measurements between the wireless station and each of the one or more FTM-enabled APs, wherein the FTM procedure comprises:
exchanging at least one FTM message with an FTM-enabled AP of the one or more FTM-enabled APs; and
calculating an FTM-based RTT measurement of the one or more FTM-based RTT measurements based on the exchanging of the at least one FTM message;
perform a non-FTM procedure with each of one or more non-FTM-enabled APs to obtain a respective one or more non-FTM-based RTT measurements, wherein the non-FTM procedure comprises:
transmitting a non-FTM message from the wireless station to a non-FTM-enabled AP of the one or more non-FTM-enabled APs;
receiving a non-FTM response message from the non-FTM-enabled AP of the one or more non-FTM-enabled APs in response to the non-FTM message; and
calculating a non-FTM-based RTT measurement of the one or more non-FTM-based RTT measurements based on a difference between a time of arrival of the non-FTM response message and a time of departure of the non-FTM message, the non-FTM-based RTT measurement being uncompensated for a delay between a receive time of the non-FTM message at the non-FTM-enabled AP of the one or more non-FTM-enabled APs and a transmit time of the non-FTM response message at the non-FTM-enabled AP of the one or more non-FTM-enabled APs; and calculate a position of the wireless station based on both the one or more FTM-based RTT measurements and the one or more non-FTM-based RTT measurements, wherein the calculation comprises:
determining whether a number of the one or more FTM-enabled APs is greater than a first threshold; and if so,
jointly calculating the position of the wireless station, a position of the one or more non-FTM-enabled APs, and a turnaround calibration factor (TCF) for at least one of the one or more non-FTM-enabled APs based on both the one or more FTM-based RTT measurements and the one or more non-FTM-based RTT measurements.

6. The wireless station of claim 5,
wherein the TCF is further based on the position of the wireless station.

7. The wireless station of claim 5, wherein the exchanging of the at least one FTM message with the FTM-enabled AP of the one or more FTM-enabled APs of the FTM procedure comprises:
transmitting an FTM request message from the wireless station to the FTM-enabled AP;
receiving an FTM response message from the FTM-enabled AP;
transmitting an FTM acknowledgement message from the wireless station to the FTM-enabled AP; and
receiving timing information from the FTM-enabled AP, wherein the timing information comprises a time of departure of the FTM response message from the FTM-enabled AP and a time of arrival of the FTM acknowledgement message at the FTM-enabled AP.

8. The wireless station of claim 5, wherein the non-FTM message comprises a request-to-send (RTS) message, and wherein the non-FTM response message comprises a clear-to-send (CTS) message.

9. A wireless station, comprising:
means for performing a fine timing measurement (FTM) procedure with each of one or more FTM-enabled access points (APs) to obtain a respective one or more FTM-based round-trip time (RTT) measurements between the wireless station and each of the one or more FTM-enabled APs, wherein the means for performing the FTM procedure comprises:
means for exchanging at least one FTM message with an FTM-enabled AP of the one or more FTM-enabled APs; and
means for calculating an FTM-based RTT measurement of the one or more FTM-based RTT measurements based on the exchanging of the at least one FTM message;
means for performing a non-FTM procedure with each of one or more non-FTM-enabled APs to obtain a respective one or more non-FTM-based RTT measurements, wherein the means for performing the non-FTM procedure comprises:
means for transmitting a non-FTM message from the wireless station to a non-FTM-enabled AP of the one or more non-FTM-enabled APs;
means for receiving a non-FTM response message from the non-FTM-enabled AP of the one or more non-FTM-enabled APs in response to the non-FTM message; and
means for calculating a non-FTM-based RTT measurement of the one or more non-FTM-based RTT measurements based on a difference between a time of arrival of the non-FTM response message and a time of departure of the non-FTM message, the non-FTM-based RTT measurement being uncompensated for a delay between a receive time of the non-FTM message at the non-FTM-enabled AP of the one or more non-FTM-enabled APs and a transmit time of the non-FTM response message at the non-FTM-enabled AP of the one or more non-FTM-enabled APs; and means for calculating a position of the wireless station based on both the one or more FTM-based RTT measurements and the one or more non-FTM-based RTT measurements, wherein the means for calculating comprises:

means for determining whether a number of the one or more FTM-enabled APs is greater than a first threshold; and if so, means for jointly calculating the position of the wireless station, a position of the one or more non-FTM-enabled APs, and a turnaround calibration factor (TCF) for at least one of the one or more non-FTM-enabled APs based on both the one or more FTM-based RTT measurements and the one or more non-FTM-based RTT measurements.

10. The wireless station of claim 9,
wherein the TCF is further based on the position of the wireless station.

11. The wireless station of claim 9, wherein the means for exchanging the at least one FTM message with the FTM-enabled AP of the one or more FTM-enabled APs of the FTM procedure comprises:

means for transmitting an FTM request message from the wireless station to the FTM-enabled AP;

means for receiving an FTM response message from the FTM-enabled AP;

means for transmitting an FTM acknowledgement message from the wireless station to the FTM-enabled AP; and means for receiving timing information from the FTM-enabled AP, wherein the timing information comprises a time of departure of the FTM response message from the FTM-enabled AP and a time of arrival of the FTM acknowledgement message at the FTM-enabled AP.

12. The wireless station of claim 9, wherein the non-FTM message comprises a request-to-send (RTS) message, and wherein the non-FTM response message comprises a clear-to-send (CTS) message.

13. A non-transitory computer-readable medium including program code stored thereon, wherein the program code includes instructions to direct a wireless station to:

perform a fine timing measurement (FTM) procedure with each of one or more FTM-enabled access points (APs) to obtain a respective one or more FTM-based round-trip time (RTT) measurements between the wireless station and each of the one or more FTM-enabled APs, wherein the FTM procedure comprises:

exchanging at least one FTM message with an FTM-enabled AP of the one or more FTM-enabled APs; and calculating an FTM-based RTT measurement of the one or more FTM-based RTT measurements based on the exchanging of the at least one FTM message;

perform a non-FTM procedure with each of one or more non-FTM-enabled APs to obtain a respective one or more non-FTM-based RTT measurements, wherein the non-FTM procedure comprises:

transmitting a non-FTM message from the wireless station to a non-FTM-enabled AP of the one or more non-FTM-enabled APs;

receiving a non-FTM response message from the non-FTM-enabled AP of the one or more non-FTM-enabled APs in response to the non-FTM message; and calculating a non-FTM-based RTT measurement of the one or more non-FTM-based RTT measurements based on a difference between a time of arrival of the non-FTM response message and a time of departure of the non-FTM message, the non-FTM-based RTT measurement being uncompensated for a delay between a receive time of the non-FTM message at the non-FTM-enabled AP of the one or more non-FTM-enabled APs and a transmit time of the non-FTM response message at the non-FTM-enabled AP of the one or more non-FTM-enabled APs; and calculate a position of the wireless station based on both the one or more FTM-based RTT measurements and the one or more non-FTM-based RTT measurements, wherein the calculation comprises:

determining whether a number of the one or more FTM-enabled APs is greater than a first threshold; and if so, jointly calculating the position of the wireless station, a position of the one or more non-FTM-enabled APs, and a turnaround calibration factor (TCF) for at least one of the one or more non-FTM-enabled APs based on both the one or more FTM-based RTT measurements and the one or more non-FTM-based RTT measurements.

14. The non-transitory computer-readable medium of claim 13, wherein the TCF is further based on the position of the wireless station.

15. The non-transitory computer-readable medium of claim 13, wherein the exchanging the at least one FTM message with the FTM-enabled AP of the one or more FTM-enabled APs of the FTM procedure comprises:

transmitting an FTM request message from the wireless station to the FTM-enabled AP;

receiving an FTM response message from the FTM-enabled AP;

transmitting an FTM acknowledgement message from the wireless station to the FTM-enabled AP; and receiving timing information from the FTM-enabled AP, wherein the timing information comprises a time of departure of the FTM response message from the FTM-enabled AP and a time of arrival of the FTM acknowledgement message at the FTM-enabled AP.

16. The non-transitory computer-readable medium of claim 13, wherein the non-FTM message comprises a request-to-send (RTS) message, and wherein the non-FTM response message comprises a clear-to-send (CTS) message.

* * * * *